US011977295B2

United States Patent
Yang et al.

(10) Patent No.: US 11,977,295 B2
(45) Date of Patent: May 7, 2024

(54) BACKLIGHT MODULE AND DISPLAY APPARATUS

(71) Applicants: MIANYANG HKC OPTOELECTRONICS TECHNOLOGY CO., LTD., Sichuan (CN); HKC CORPORATION LIMITED, Shenzhen (CN)

(72) Inventors: Xiaohui Yang, Sichuan (CN); Shin Moo Keun, Sichuan (CN); Haoxuan Zheng, Sichuan (CN)

(73) Assignees: MIANYANG HKC OPTOELECTRONICS TECHNOLOGY CO., LTD., Sichuan (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/145,975

(22) Filed: Dec. 23, 2022

(65) Prior Publication Data
US 2023/0205006 A1 Jun. 29, 2023

(30) Foreign Application Priority Data
Dec. 29, 2021 (CN) .......................... 202111649274.X

(51) Int. Cl.
*G02F 1/13357* (2006.01)

(52) U.S. Cl.
CPC .. *G02F 1/133608* (2013.01); *G02F 1/133603* (2013.01)

(58) Field of Classification Search
None
See application file for complete search history.

(56) References Cited

U.S. PATENT DOCUMENTS

| 6,902,300 B2 * | 6/2005 | Lee | G02F 1/133604 |
| | | | 362/306 |
| 2006/0104083 A1 * | 5/2006 | Kwon | G02F 1/133608 |
| | | | 362/330 |

FOREIGN PATENT DOCUMENTS

| CN | 1804698 | 7/2006 |
| CN | 101387785 | 3/2009 |
| CN | 203413555 | 1/2014 |
| CN | 104765198 | 7/2015 |
| CN | 106200126 | 12/2016 |
| CN | 108153046 | 6/2018 |
| CN | 209992784 | 1/2020 |
| CN | 210605286 | 5/2020 |
| CN | 211741782 | 10/2020 |
| CN | 213876223 | 8/2021 |

(Continued)

OTHER PUBLICATIONS

CNIPA, First Office Action for CN Application No. 202111649274. X, dated Jun. 17, 2022.

*Primary Examiner* — Thanh Nhan P Nguyen
(74) *Attorney, Agent, or Firm* — Hodgson Russ LLP

(57) ABSTRACT

A backlight module includes a substrate, a luminous source, an optical film, and a support structure, the luminous source is disposed on the substrate and is opposite to the optical film, the support structure is disposed between the substrate and the optical film, the support structure includes a base plate and at least two elastic support portions arranged at intervals, the base plate is disposed on the substrate, and the elastic support portions are disposed on a side of the base plate away from the substrate, and support the optical film.

16 Claims, 5 Drawing Sheets

(56) References Cited

FOREIGN PATENT DOCUMENTS

| | | |
|---|---|---|
| CN | 214123350 | 9/2021 |
| IN | 212433550 | 1/2021 |
| JP | 2010218915 | 9/2010 |
| TW | 200903103 | 1/2009 |

* cited by examiner

BACKLIGHT MODULE AND DISPLAY APPARATUS

CROSS-REFERENCE TO RELATED APPLICATION

This application claims priority to Chinese Patent Application No. 202111649274.X, filed Dec. 29, 2021, the entire disclosure of which is incorporated herein by reference.

FIELD OF TECHNOLOGY

The present disclosure relates to the field of display technology, more particularly, to a backlight module and a display apparatus.

BACKGROUND

Currently, a backlight module of a liquid crystal display apparatus usually uses light emitting diodes (LEDs for short) as luminous sources. Based on a position of the luminous source, the backlight module may include two types: a direct-lit type and an edge-lit type. The direct-lit type of the backlight module has attracted the attention of researchers in the industry because of the advantages of low weight, low power consumption, and high brightness.

In addition to the luminous source, the direct-lit type of the backlight module usually includes components such as a plastic frame and an optical film. The optical film is disposed above the luminous source. In order to prevent the optical film from bending and deforming under the action of gravity or external force, a support structure is required to support the optical film, but the support structure is easy to scratch and poke the optical film, resulting in poor display effect and other problems.

SUMMARY

There are provided a backlight module and a display apparatus according to embodiments of the present disclosure. The technical solution is as below.

According to a first aspect of embodiments of the present disclosure, there is provided a backlight module, including a substrate, a luminous source, an optical film, and a support structure, where the luminous source is disposed on the substrate and is opposite to the optical film, the support structure is disposed between the substrate and the optical film, the support structure includes a base plate and at least two elastic support portions arranged at intervals, the base plate is disposed on the substrate, and the elastic support portions are disposed on a side of the base plate away from the substrate, and support the optical film.

According to a second aspect of embodiments of the present disclosure, there is provided a display apparatus, including a display panel and the backlight module described above, where the display panel is disposed on a light-emitting side of the backlight module.

It should be understood that the general description above and the following details are exemplary and explanatory only and cannot limit the present disclosure.

BRIEF DESCRIPTION OF THE DRAWINGS

The drawings herein are incorporated into the specification and constitute a part of the specification, showing embodiments that conform to the present disclosure, and are used with the specification to explain principles of the present disclosure. Apparently, the accompanying drawings in the following description show merely some embodiments of the present invention, and a person of ordinary skill in the art may still derive another drawing from these accompanying drawings without creative efforts.

DETAILED DESCRIPTION OF THE EMBODIMENTS

Example embodiments will now be described more completely with reference to the accompanying drawings. Example embodiments, however, can be implemented in various forms and should not be understood as limited to the examples set forth herein; instead, these embodiments are provided so that the present disclosure will be thorough and complete, and will fully convey the concept of example embodiments to those skilled in the art.

Furthermore, features, structures, or characteristics described may be combined in one or more embodiments in any suitable manner. In the following descriptions, many specific details are provided to thoroughly understand the embodiments of the present disclosure. However, those skilled in the art will realize that the technical solutions of the present disclosure may be practiced without one or more of the specific details, or other methods, components, apparatuses, steps, and the like may be used. In other cases, well-known methods, apparatuses, implementations, or operations have not been shown or described in detail to avoid obscuring the aspects of the present disclosure.

The following further describes the present disclosure in detail with reference to the accompanying drawings and embodiments. It should be noted herein that the technical features involved in the embodiments of the present disclosure described below may be combined with each other as long as there is no conflict with each other. The embodiments described below with reference to the accompanying drawings are exemplary, and are intended to explain the present disclosure and should not be understood as a limitation of the present disclosure.

Embodiment 1

The present disclosure provides a backlight module, which is applied to a direct-lit type of liquid crystal display apparatus, and includes a substrate 100, a luminous source 200, and a support structure 300. Optionally, as shown in FIG. 1, the luminous source 200 may be a Mini LED (Mini Light Emitting Diode).

Figure 1:
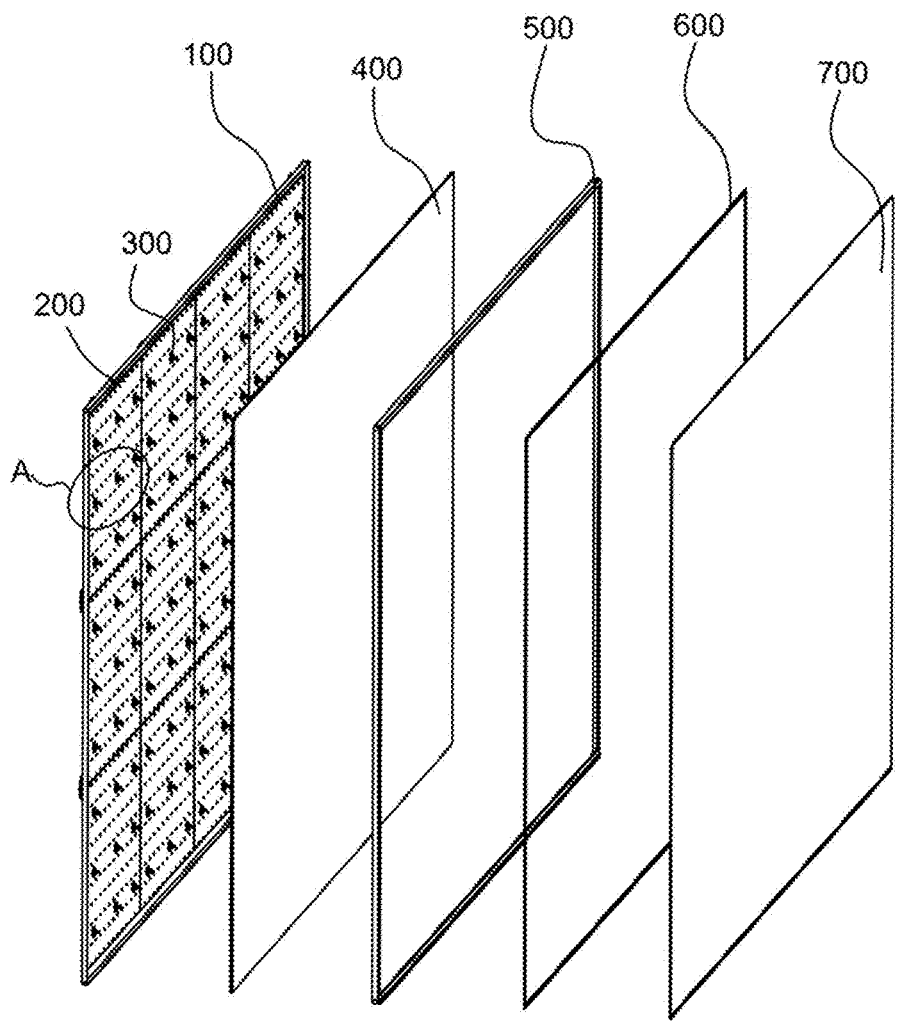
FIG. 1 is a schematic structural exploded view of a display apparatus according to an embodiment of the present disclosure.
Figure 2:
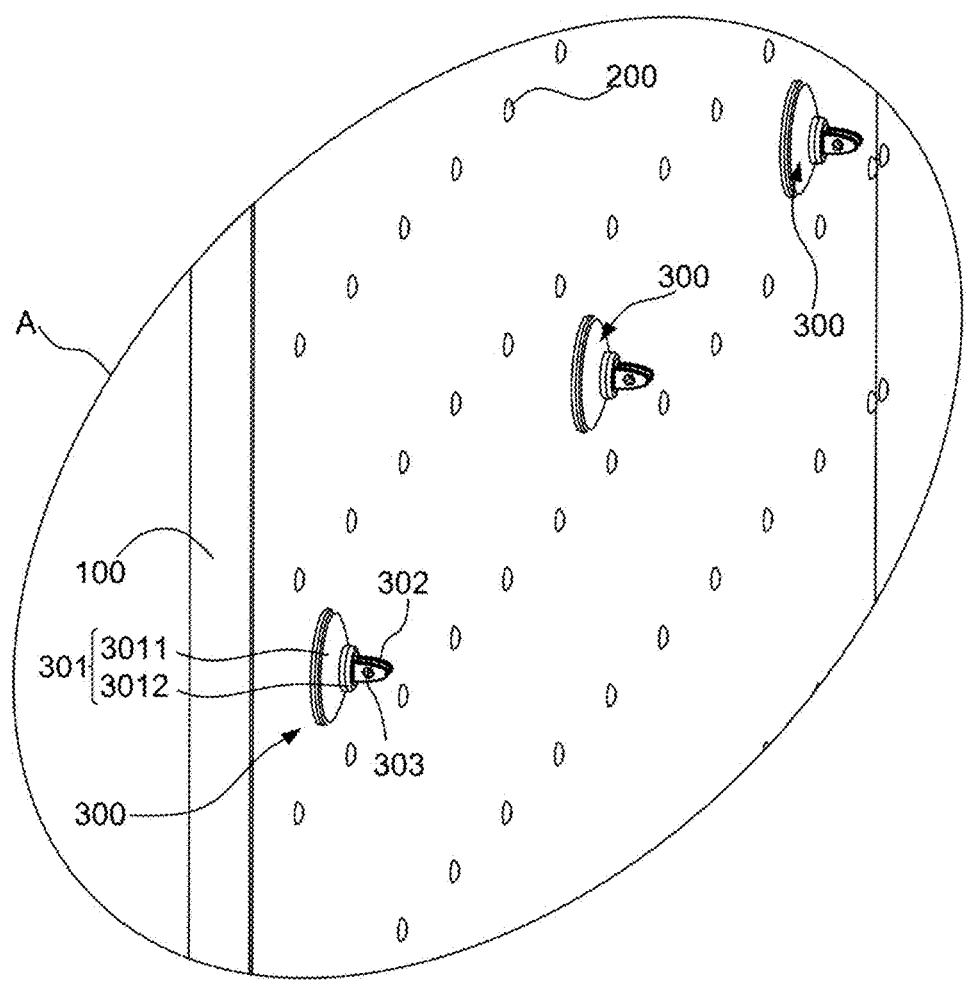
FIG. 2 is a partial enlarged diagram of a part A in FIG. 1.

As shown in FIG. 1 or FIG. 2, a side of the substrate 100 facing an interior of the backlight module is provided with the luminous sources 200 to emit light. The luminous sources 200 are evenly arranged on the substrate 100. In other words, the luminous sources 200 and the substrate 100 constitute a lamp panel. In a preferred embodiment, the luminous source 200 may be a light emitting diode (LED), but is not limited thereto. Further, in order to improve the display effect, an optical film 400 is disposed on an opposite side of the luminous source 200, and the optical film 400 may adjust the light emitted by the luminous source 200 for emitting.

Further, as shown in FIG. 1 and FIG. 2, in order to prevent the optical film 400 from collapsing under the action of gravity thereof or external force, a plurality of support structures for supporting the optical film 400 are disposed between the substrate 100 and the optical film 400.

Furthermore, in order to solve the problem of poking and scratching the optical film 400, a plurality of support structures 300 made of soft elastic materials are disposed on a side of the substrate 100 close to the optical film 400, so as to elastically support the optical film 400. This provides a buffering force for the optical film 400, thereby reducing the problem that the support structure 300 pokes the optical film 400 and the problem of scratches between the support structure 300 and the optical film 400.

It should be understood that after the elastic support structure 300 is adopted, when the optical film 400 is under the action of gravity or external force, the support structure 300 may be in contact with the optical film 400, and an elastic buffer force may be applied on the optical film 400, which may reduce the problem that the support structure 300 pokes the optical film 400 or scratches the optical film 400 during display apparatus testing or transportation.

Further, as shown in FIG. 1 or FIG. 2, each support structure 300 is evenly spaced from the luminous sources 200 in the substrate 100, and each support structure 300 is perpendicular to the backlight module, so as to better support the optical film 400. The support structure 300 may be set based on a quantity of luminous sources 200. Optionally, one support structure 300 may be set between two luminous sources 200, or the support structure 300 may be fixed at the center of four luminous sources 200. This can not only achieve the function of supporting the optical film 400, but also the support structures 300 can be arranged evenly in the substrate 100, which avoids the problem of shadows, thereby improving the display effect.

Specifically, in order to prevent the support structure 300 from poking the optical film 400, damaging the optical film 400, and affecting the display effect, the support structure 300 is made of elastic materials, so as to provide an elastic buffer force to the optical film 400. Therefore, the problem that the support structure 300 is in contact with the optical film 400 instantly, which damages the optical film 400 is reduced.

As shown in FIG. 3, FIG. 4, FIG. 5, or FIG. 6, the support structure 300 includes a base plate 301 and at least two elastic support portions 302 arranged at intervals. The base plate 301 is connected to a Mini LED (Mini Light Emitting Diode) lamp panel on the substrate 100 for fixing the support structure 300 on the substrate 100. The elastic support portion 302 is disposed on a side of the base plate 301 away from the substrate 100, and corresponding to the optical film 400, that is, the support structure 300 is sandwiched between the substrate 100 and the optical film 400, so as to realize the function of supporting the optical film 400.

Further, a gap is left between a top end of the elastic support portion 302 and the optical film 400, on the one hand, to ensure that the optical film 400 has a specific deformation space; and on the other hand, to avoid direct contact between the elastic support portion 302 and the optical film 400, which may poke the optical film 400 or cause scratches between the elastic support portion 302 and the optical film 400, so that the display effect of the display apparatus may be ensured.

Figure 3:
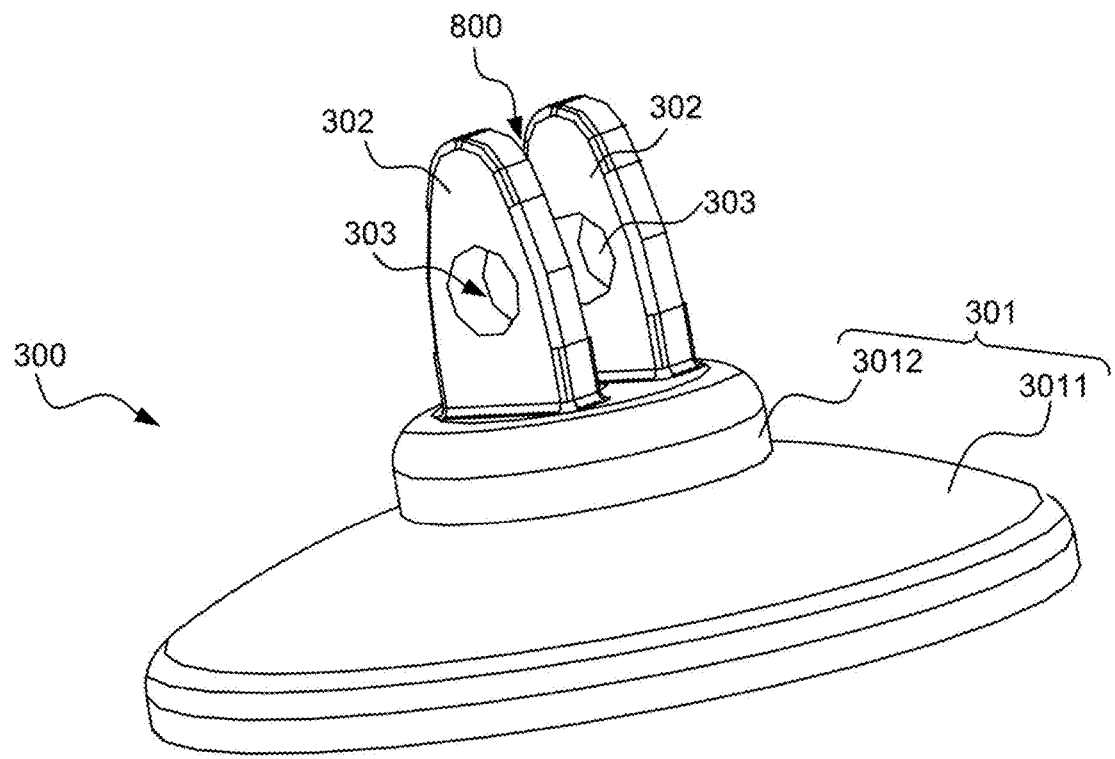
FIG. 3 is a schematic structural diagram of a support structure according to an embodiment of the present disclosure.
Figure 6:
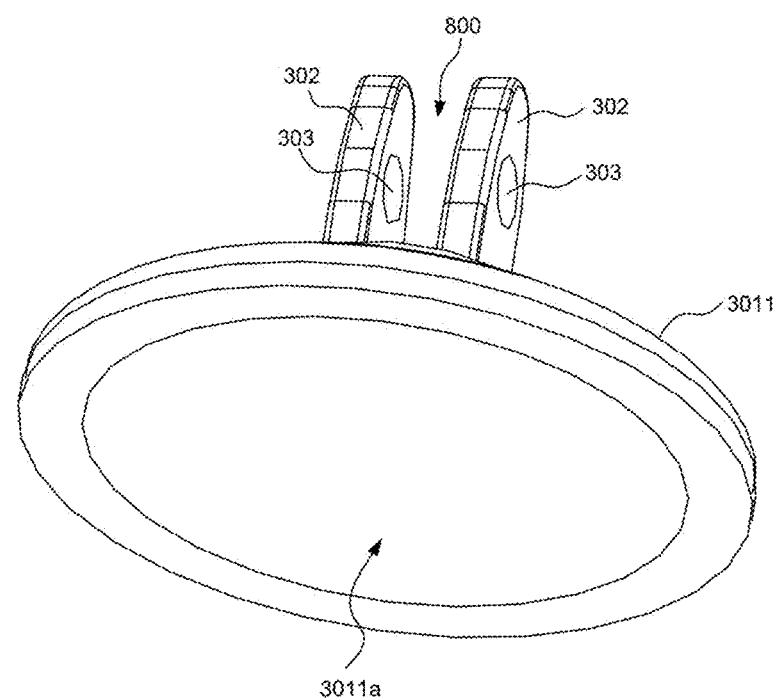
FIG. 6 is a schematic structural diagram of a support structure from another perspective according to an embodiment of the present disclosure.

In addition, in order for the support structure 300 to have an elastic deformation capability, optionally, the support structure 300 may be made of rubber materials, or may be made of elastic silicone materials. In addition, in order to facilitate deformation and supporting, the elastic support portion 302 is made into a sheet-like structure, as shown in FIG. 3 or FIG. 6. A height direction of the elastic support portion 302 should be perpendicular to the substrate 100 and the optical film 400 for supporting the optical film 400.

In an optional embodiment, as shown in FIG. 3, FIG. 4, FIG. 5, or FIG. 6, the support structure 300 includes two elastic support portions 302 arranged at intervals, the two elastic support portions 302 are parallel to each other, both of the two elastic support portions 302 are perpendicular to the base plate 301, and a deformation accommodating cavity 800 for accommodating deformation of the elastic support portions 302 is formed between the two elastic support portions 302. Because the support structure 300 is made of elastic materials, when being influenced by gravity thereof or external force, the optical film 400 may recess towards the substrate 100. The optical film 400 may first contact tops of the two elastic support portions 302, and the elastic support portions 302 are deformed and bent toward the deformation accommodating cavity 800 by the pressing force to reduce the pressing force of the optical film 400 on the elastic support portion 302. In other words, the elastic support portion 302 plays a buffering role on the optical film 400, so as to avoid rigid connection between the elastic support portion 302 and the optical film 400, and avoid the problem of poking the optical film 400.

It should be noted that, in this process, the elastic support portion 302 is always connected to the optical film 400, so as to ensure the support function for the optical film 400. In addition, the elastic support portion 302 is deformed due to the action of the pressing force, and the elastic support portion 302 is flexibly connected to the optical film 400 to prevent the elastic support portion 302 from poking the optical film 400.

Figure 4:
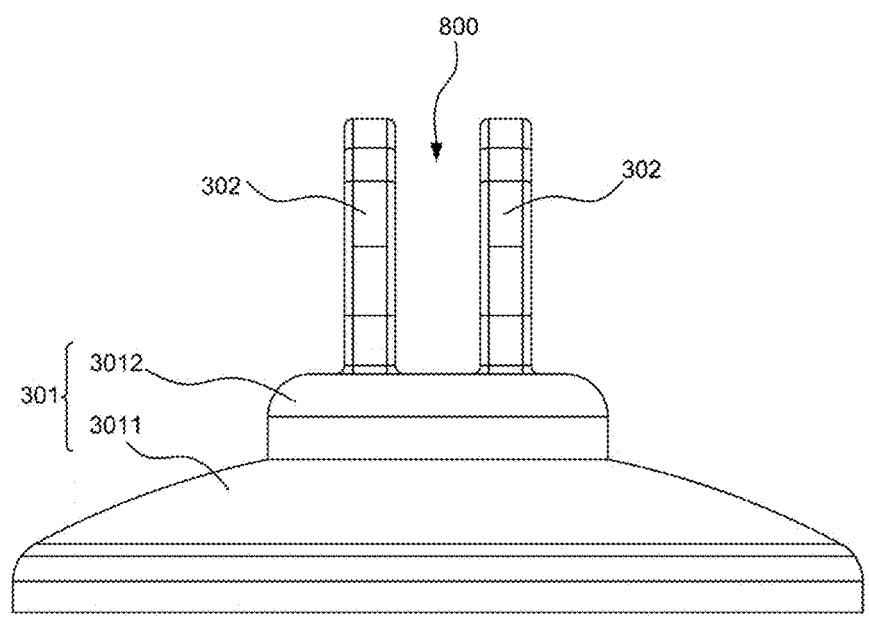
FIG. 4 is a schematic structural diagram of the support structure from a perspective according to an embodiment of the present disclosure.
Figure 5:
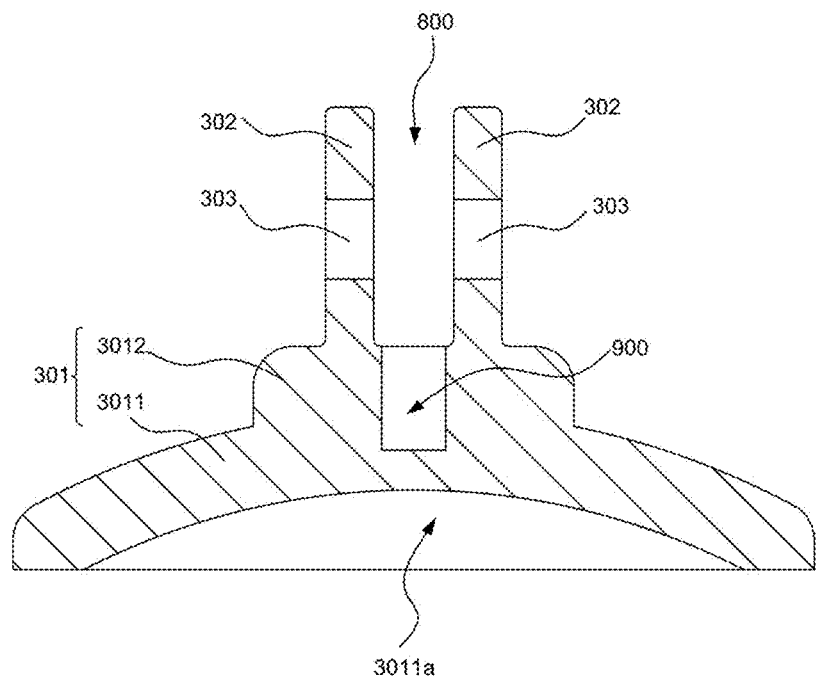
FIG. 5 is a schematic sectional view of the support structure according to an embodiment of the present disclosure.

It should be understood that, as shown in FIG. 4 or FIG. 5, when the optical film 400 collapses downward under the action of gravity thereof or external force, the optical film 400 is in contact with the tops of the two elastic support portions 302. The top ends of the two elastic support portions 302 are gradually bent and deformed toward the deformation accommodating cavity 800. The deformation accommodating cavity 800 provides a buffer space for elastic deformation for the two elastic support portions 302. When the optical film 400 is not affected by gravity, the top ends of the elastic support portions 302 can return to an original state by itself, so as to protect the optical film 400, and the elastic support portion 302 may not be deformed by the external force. Therefore, it is not easy to produce shadows, and the display quality can be improved.

In addition, the elastic support portion 302 has a specific amount of force deformation while ensuring sufficient support strength, so as to prevent the elastic support portion 302 from directly contacting the optical film 400 rigidly, poking the optical film 400, and resulting in the elastic support portion 302 being connected to the optical film 400 flexibly, which provides an elastic buffer force for the optical film 400 to contact the elastic support portion 302 instantly, prevents the elastic support portion 302 from poking the optical film 400, thereby ensuring the stability of the display effect.

In another optional embodiment, under the action of ensuring that the elastic support portion 302 supports the optical film 400, a single elastic support portion 302 may also be used to reduce the cost input. The quantity of the elastic support portions 302 is not specifically limited.

Certainly, more than two elastic support portions 302 can be used to better ensure that the elastic support portions 302 support the optical film 400, provide better elastic buffer force, and avoid poking the optical film 400, And the elastic support portions 302 are parallel to each other, and form a deformation accommodating cavity 800 with an adjacent elastic support portion 302, so as to provide a deformation space, provide the elastic buffer force for the optical film 400, and prevent the elastic support portion 302 from poking the optical film 400.

Further, as shown in FIG. 3, FIG. 5, or FIG. 6, in order to better provide elastic deformation and ensure a specific support strength, the elastic support portion 302 is provided with at least one deformation through hole 303, as shown in FIG. 3, FIG. 5, and FIG. 6. Subjected to the pressing force of the optical film 400, on the one hand, the elastic support portion 302 is driven to deform toward the deformation accommodating cavity 800, and on the other hand, the elastic support portion 302 may gradually be pressed toward the deformation through hole 303. The deformation through hole 303 is pressed and deformed to provide additional elastic deformation for the elastic support portion 302. The deformation through hole 303 provides an additional elastic buffer force for the optical film 400, so as to prevent the elastic support portion 302 from poking the optical film 400, thereby ensuring the display effect of the display panel.

In an embodiment, as shown in FIG. 1, FIG. 2, FIG. 3, FIG. 5, or FIG. 6, the elastic support portion 302 is provided with deformation through holes 303, and opening directions of the deformation through holes 303 are a parallel arrangement direction of the two elastic support portions 302, so as to ensure that when the deformation through holes 303 are pressed, an amount of deformation is larger, and the deformation is easier to occur. It should be understood that a single elastic support portion 302 is provided with one deformation through hole 303, and each elastic support portion 302 is corresponding to one deformation through hole 303. The deformation through holes 303 on the elastic support portions 302 may be located at a same vertical height, or may be at different vertical heights. Optionally, the deformation through holes 303 on the elastic support portions 302 may be at a same vertical height to ensure that the elastic support portions 302 have a same elastic deformation capacity, the design is simpler, and the production cost is reduced.

It should be noted that the deformation through holes 303 on the elastic support portions 302 are located at the same vertical height, that is, projections of the deformation through holes 303 on the elastic support portions 302 coincide with each other along the arrangement direction of the elastic support portions 302.

In addition, one deformation through hole 303 may be opened at the center of the elastic support portion 302, so as to ensure a better deformation capacity of the elastic support portion 302, and the deformation through hole 303 may also be opened at any position of the elastic support portion 302. A specific position is not specifically limited.

In another embodiment, a plurality of deformation through holes 303 may also be opened on the elastic support portion 302, so as to provide more elastic deformation amount for the elastic support portion 302. It should be noted that when a plurality of deformation through holes 303 are used, the deformation through holes 303 may be communicated with each other, or may be disconnected at intervals. And an area of the deformation through hole 303 should be smaller than an area of a plane of the elastic support portion 302.

Further, the deformation through holes 303 may be in one or more shapes of a cylindrical shape, a waist shape, or a conical shape. Optionally, the deformation through hole 303 is in a cylindrical structure, as shown in FIG. 3 or FIG. 6, and an axial direction of the cylindrical deformation through hole 303 is the same as an arrangement or thickness direction of the elastic support portion 302. The cylindrical structure can ensure stable elastic deformation capability, and also enable the opening method to be simpler.

It should be noted that when one elastic support portion 302 is corresponding to a plurality of deformation through holes 303, deformation through holes 303 of a same shape and size may be opened in the elastic support portion 302, or deformation through holes 303 of the same shape but different sizes may be opened in the elastic support portion 302, and deformation through holes 303 of different shapes may be opened. The shape and size of the deformation through holes 303 opened on the elastic support portion 302 are not limited.

Further, in order to prevent the elastic support portion 302 from absorbing the light emitted by the luminous source 200 on the substrate 100, the support structure 300 is made of a transparent material as a whole, that is, the support structure 300 has a transparent layer, so as to avoid shadows on the display panel. In order to prevent the light emitted from the luminous source from being refracted and absorbed in the elastic support portion 302, the width of the elastic support portion 302 gradually decreases along the vertical direction from the substrate 100 to the optical film 400.

Optionally, as shown in FIG. 3 or FIG. 6, the elastic support portion 302 may be in a smooth arc-shaped structure to ensure the contact stability between the elastic support portion 302 and the optical film 400 while ensuring that the width thereof is gradually reduced, which ensures that the elastic support portion 302 is not scratched with the optical film 400, thereby ensuring the display effect.

Specifically, as shown in FIG. 3, the thickness of an outer contour of the elastic support portion 302 gradually decreases from the inner side of the elastic support portion 302 to the outer side of the elastic support portion 302, so as to form a trapezoidal structure. This structure is mainly used to reduce the refraction and absorption of the light emitted by the luminous source inside the elastic support portion 302, reduce the shadow effect, thereby improving the display effect of the display panel.

Further, as shown in FIG. 3, FIG. 4, or FIG. 5, the base plate 301 includes an adsorption portion 3011 and a fixing portion 3012. The adsorption portion 3011 is fixed on the lamp panel of the substrate 100, while a side of the adsorption portion 3011 away from the substrate 100 is provided with the fixing portion 3012, and the adsorption portion 3011 and the fixing portion 3012 can be integrally formed or connected by welding, riveting, or screwing. Optionally, the adsorption portion 3011 and the fixing portion 3012 are integrally formed with a simpler structure and a more convenient operation. In addition, the elastic support portion 302 is vertically fixed on the side of the fixing portion 3012 away from the adsorption portion 3011, and a side of the elastic support portion 302 with a larger width is integrally formed with the fixing portion 3012.

Specifically, the fixing portion 3012 and the adsorption portion 3011 are integrally formed to form a boss structure, as shown in FIG. 4. In other words, the fixing portion 3012 is disposed at an upper end of the adsorption portion 3011, and a size of the fixing portion 3012 is smaller than a size of the adsorption portion 3011. For example, as shown in FIG. 3 or FIG. 6, the fixing portion 3012 is in a circular structure, the adsorption portion 3011 is also in the circular structure, and a diameter of the fixing portion 3012 is smaller than a diameter of the adsorption portion 3011. It should be understood that the diameter of the fixing portion 3012 should be greater than or equal to the arrangement distance between the elastic support portions 302, so that the elastic support portion 302 can stably support the optical film 400.

Further, as shown in FIG. 5 or FIG. 6, the adsorption portion 3011 includes an adsorption recess 3011a recessed inwardly, a groove direction of the adsorption recess 3011a faces the substrate 100, and the adsorption recess 3011a may be a square, rectangular, triangular, or arc-shaped groove. Optionally, the adsorption recess 3011a is an arc-shaped groove, which is vacuum-adsorbed with the lamp panel of the substrate 100, and the arc-shaped groove is closely attached to the lamp panel, to squeeze the excess air in the adsorption recess 3011a to realize the vacuum adsorption of the adsorption portion 3011 and the lamp panel on the substrate 100. It should be understood that the vacuum adsorption force between the adsorption recess 3011a and the lamp panel on the substrate 100 should be greater than the gravity of the whole support structure 300, and will not slip off due to long-term use, so as to ensure the overall stability. In addition, the vacuum adsorption method enables the method of assembling and disassembling the support structure 300 to be simpler, and the structure of the lamp panel is not easily damaged, which further simplifies the assembly process and reduces the production cost.

It should be noted that when the arc-shaped groove is used, the width of the adsorption recess 3011a gradually decreases along the vertical direction from the substrate 100 to the optical film 400. It should be understood that the arc-shaped adsorption recess 3011a has stronger adsorption and more reliable adhesion.

Further, as shown in FIG. 5, in order to ensure that the arc-shaped groove surface of the adsorption recess 3011a is connected to the lamp panel on the substrate 100 by vacuum adsorption, a connecting portion between the fixing portion 3012 and the adsorption portion 3011 is provided with a groove 900. The groove 900 may provide a deformation space for the adsorption portion 3011 and the fixing portion 3012 when the adsorption portion 3011 and the lamp panel are vacuum-adsorbed, so as to ensure that a surface of the groove 900 of the adsorption recess 3011a is completely fitted with the lamp panel, thereby ensuring the adsorption stability of the adsorption portion 3011 and the lamp panel.

Specifically, as shown in FIG. 5, the opening direction of the groove 900 faces the optical film 400, and the groove 900 is provided between the two elastic support portions 302. Optionally, the groove width of the groove 900 may be the same as the distance between the two adjacent elastic support portions 302, or the groove width may be smaller than the distance between the two adjacent elastic support portions 302, or the groove may be located at the center of the two adjacent elastic support portions 302. The location is not specifically limited.

Further, in order to avoid a shading effect of the support structure 300, the support structure 300 is made of transparent materials, and also needs to satisfy the elastic effect of the support structure 300. Therefore, the support structure 300 may be integrally formed with elastic transparent rubber, or may also be integrally formed with elastic transparent silicone.

In addition, since the production of the lamp panel of the Mini LED (Mini Light Emitting Diode) is relatively complicated, and the lights are numerous and dense, it is difficult to find a proper position for the support structure 300 to be placed on the lamp panel, and it is easy for the support structure 300 to shield the light emitted from the luminous source, so that optical shadows appear, thereby causing subjective undesirable problems.

Figure 7:
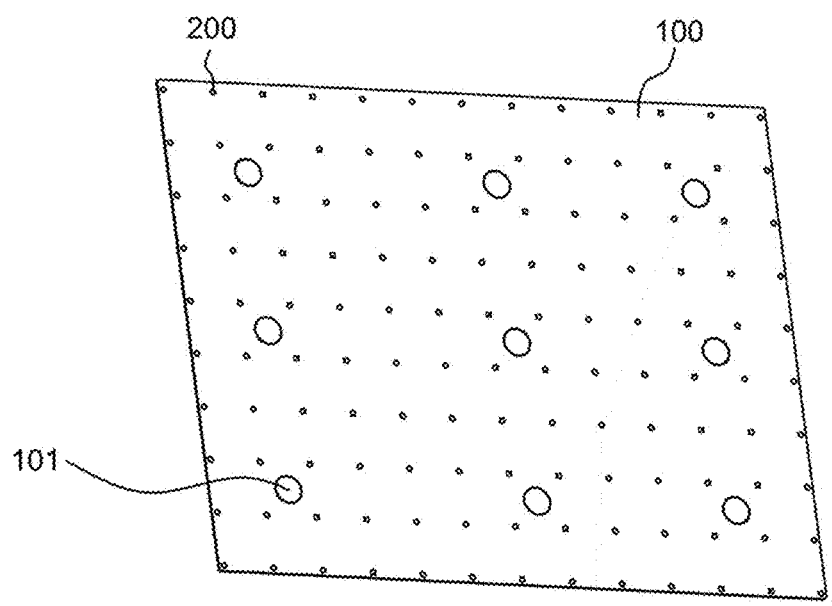
FIG. 7 is a schematic structural diagram of a positioning portion assembled on a substrate according to an embodiment of the present disclosure.

Based on this, in order to solve the foregoing problems, a positioning portion 101 for positioning the support structure 300 is designed on the lamp panel. As shown in FIG. 7, the adsorption portion 3011 in the support structure 300 is corresponding to the positioning portion 101, and the support structure 300 is fixed by vacuum adsorption.

Optionally, as shown in FIG. 7, the positioning portion 101 may use a positioning mark line, and the adsorption portion 3011 is adsorbed at the positioning mark line, which makes positioning easier and reduces problems such as optical shadows.

Embodiment 2

Embodiment 2 of the present disclosure further provides a display apparatus, including a display panel 700 and the backlight module in the Embodiment 1. The backlight module further includes a backplane (not shown in the figure), a plastic frame 500, and a foam 600. The substrate 100 is disposed on the backplane. Generally, the backplane further includes a main plate and a side plate perpendicular to the main plate. The substrate 100 is disposed on the main plate and is parallel to the main plate. An elastic support structure 300 is disposed between the substrate 100 and the optical film 400, the plastic frame 500 is disposed on the side plate, the display panel is disposed on the plastic frame 500, and the foam 600 is disposed between the display panel and the plastic frame 500. When being bent under force, the optical film 400 is in contact with the elastic support portion 302 of the support structure 300, and the elastic support portion 302 applies an elastic buffer force on the optical film 400 to reduce a reaction force generated by the elastic support portion 302 to the optical film 400, so as to prevent the support structure 300 from poking the optical film 400 and damage the optical film 400.

In addition, terms "first" and "second" are used for description only, and are not to be understood as indicating or implying relative importance or implicitly indicating the number of technical features indicated. Thus, a feature defined by "first" or "second" may explicitly or implicitly include one or more of the features. In the description of the present disclosure, "a plurality of" means two or more, unless specifically defined otherwise.

In the present disclosure, unless expressly stipulated and defined otherwise, the terms such as "assembly" and "connection" should be understood in a broad sense. For example, "connection" may be a fixed connection, a detachable connection, or an integral connection; may be a mechanical connection, or may be an electrical connection;

or may be a direct connection, an indirect connection by means of an intermediate medium, or a connection between two elements or an interaction between two elements. For a person of ordinary skill in the art, the specific meanings of the foregoing terms in the present disclosure may be understood according to specific circumstances.

In the description of this specification, description of the reference terms "some embodiments", "for example" and the like means that a particular feature, structure, material, or characteristic described in connection with the embodiment or example is included in at least one embodiment or example of the present disclosure. In this specification, schematic representations of the foregoing terms are not necessarily directed to the same embodiment or example. Moreover, the particular feature, structure, material or characteristic described may be combined in any suitable manner in any one or more embodiments or examples. Furthermore, without contradiction, those skilled in the art may combine and integrate the different embodiments or examples described in this specification, as well as the features of the different embodiments or examples.

Although the embodiments of the present disclosure have been shown and described above, it should be understood that the embodiments are exemplary and should not be construed as limiting the present disclosure. A person of ordinary skill in the art can make changes, modifications, substitutions, and alterations to the embodiments within the scope of the present disclosure, so any changes or modifications made according to the claims and descriptions of the present disclosure shall fall within the scope of the patent of the present disclosure.

What is claimed is:

1. A backlight module, comprising:
    a substrate;
    an optical film;
    a luminous source disposed on the substrate and opposite to the optical film; and
    a support structure disposed between the substrate and the optical film, comprising:
       a base plate disposed on the substrate; and
       at least two elastic support portions arranged at intervals and disposed on a side of the base plate away from the substrate for supporting the optical film;
    wherein each of the at least two elastic support portions is provided with at least one deformation through hole; and
    wherein in an arrangement direction of the at least two elastic support portions arranged at intervals, the at least one deformation through hole penetrates the elastic support portion along the arrangement direction of the at least two elastic support portions.

2. The backlight module according to claim 1, wherein adjacent elastic support portions are parallel to each other; and
    wherein in the arrangement direction of the at least two elastic support portions arranged at intervals, projections of the deformation through holes on the at least two elastic support portions coincide with each other.

3. The backlight module according to claim 1, wherein along a vertical direction from the substrate to the optical film, widths of the at least two elastic support portions gradually decrease.

4. The backlight module according to claim 1, wherein the base plate comprises an adsorption portion and a fixing portion, and the fixing portion is disposed between the adsorption portion and the at least two elastic support portions; and
    wherein the adsorption portion comprises an adsorption recess recessed in a direction away from the substrate, and the adsorption recess is connected to the substrate through adsorption.

5. The backlight module according to claim 4, wherein along a vertical direction from the substrate to the optical film, a width of the adsorption recess gradually decreases.

6. The backlight module according to claim 4, wherein along a vertical direction from the substrate to the optical film, a side of the fixing portion away from the adsorption portion is provided with a groove, and the groove is located between adjacent elastic support portions.

7. The backlight module according to claim 1, wherein the support structure is a transparent structure.

8. The backlight module according to claim 1, wherein the deformation through holes are in one or more shapes of a cylindrical shape, a waist shape, or a conical shape; and/or
    a side of the substrate close to the optical film is provided with a positioning portion, and the base plate is adsorbed on the positioning portion.

9. A display apparatus, comprising a display panel and a backlight module wherein the display panel is disposed on a light-emitting side of the backlight module, wherein the backlight module comprises:
    a substrate;
    an optical film;
    a luminous source disposed on the substrate and opposite to the optical film; and
    a support structure disposed between the substrate and the optical film, comprising:
       a base plate disposed on the substrate; and
       at least two elastic support portions arranged at intervals and disposed on a side of the base plate away from the substrate for supporting the optical film;
    wherein each of the at least two elastic support portions is provided with at least one deformation through hole; and
    wherein in an arrangement direction of the at least two elastic support portions arranged at intervals, the at least one deformation through hole penetrates the elastic support portion along the arrangement direction of the at least two elastic support portions.

10. The display apparatus according to claim 9, wherein adjacent elastic support portions are parallel to each other; and
    wherein in the arrangement direction of the at least two elastic support portions arranged at intervals, projections of the deformation through holes on the at least two elastic support portions coincide with each other.

11. The display apparatus according to claim 9, wherein along a vertical direction from the substrate to the optical film, widths of the at least two elastic support portions gradually decrease.

12. The display apparatus according to claim 9, wherein the base plate comprises an adsorption portion and a fixing portion, and the fixing portion is disposed between the adsorption portion and the at least two elastic support portions; and
    wherein the adsorption portion comprises an adsorption recess recessed in a direction away from the substrate, and the adsorption recess is connected to the substrate through adsorption.

13. The display apparatus according to claim 12, wherein along a vertical direction from the substrate to the optical film, a width of the adsorption recess gradually decreases.

14. The display apparatus according to claim 12, wherein along a vertical direction from the substrate to the optical film, a side of the fixing portion away from the adsorption portion is provided with a groove, and the groove is located between adjacent elastic support portions.

15. The display apparatus according to claim 9, wherein the support structure is a transparent structure.

16. The display apparatus according to claim 9, wherein the deformation through holes are in one or more shapes of a cylindrical shape, a waist shape, or a conical shape; and/or
    a side of the substrate close to the optical film is provided with a positioning portion, and the base plate is adsorbed on the positioning portion.

\* \* \* \* \*